United States Patent Office 3,228,902
Patented Jan. 11, 1966

3,228,902
PROCESS FOR FORMING POLYMERIC DISPERSIONS OF AROMATIC AMIDES WITH NEGATIVE SOLUBILITY
Lawrence Forwood Beste, Wilmington, Del., assignor to E. I. du Pont de Nemours and Company, Wilmington, Del., a corporation of Delaware
No Drawing. Filed Jan. 29, 1963, Ser. No. 254,583
4 Claims. (Cl. 260—29.2)

This invention relates to the preparation of dispersions of certain linear polyamides containing benzenoid rings in the chain, and more particularly to an improved method of preparing such dispersions having desirably small particle sizes.

It is known that dispersions of polymers may be made by forming the polymer in a dispersed state from the monomeric reactants, or by adding a non-solvent to a solution of the polymer under conditions of vigorous agitation, or by cooling solutions of polymers in a suitable solvent to below the temperature at which particles of solid polymer precipitate, or by dispersing solid polymer previously comminuted by spray-drying a polymer solution or grinding larger polymer masses. Each of these methods is of advantage in specific cases. For example, preparation of dispersions by polymerization of vinyl monomers, such as vinyl acetate, is a simple and commonly used process. Other polymers must be made in solution or in the melt, and consequently must be made into dispersions by more indirect methods, such as precipitation from solution. This latter method is suitable for most polymers, that is, those which have a reduced solubility at lower temperatures. Although many polymers may be precipitated from solution in particulate form, it is frequently difficult to obtain small particle sizes, such as those that would permit a stable dispersion to be formed.

It is an object of this invention to provide a means for preparing dispersions of polymers from solutions in a solvent of low volatility. It is a further object to provide dispersions of high-melting aromatic linear polyamides having novel solubility properties. A particular object is to provide a means for preparing dispersions from linear polyamides having meta-phenylene or para-phenylene linkages between the carbonamide groups.

According to the process of this invention, an aromatic polyamide, in solution in a solvent at approximately room temperature, is diluted with a quantity of non-solvent which is 50–95% of that which would cause precipitation of solid polymer on a long standing, and then heated rapidly to an elevated temperature equal to or up to 25° C. above the normal boiling point of said solvent, thereby reducing the polymer solubility and effecting precipitation of the solid polymer particles. This dispersion is then rapidly cooled in a suitable manner to a temperature at least 10° C. below the normal boiling point of said solvent, preferably by partial flash evaporation, to give a dispersion that persists at room temperature.

In particular, the process of this invention is carried out by the following sequence of steps:

(a) A solution of aromatic polyamide in a solvent selected from the group consisting of dimethylformamide, dimethylacetamide, and N - methyl - 2 - pyrrolidone, N-methylsuccinimide, N-methylglutarimide, and dimethylsulfoxide is adjusted to a polymer concentration of 0.5 to 10% by weight, preferably 2–5% and a suitable temperature within the range of from 0 to 60° C.

(b) While maintaining the aforementioned temperature range, water or other suitable miscible non-solvent is dissolved in the above polymer solution almost to the point of incipient cloudiness. The appropriate quantity of non-solvent is that which is 50 to 95% by weight, preferably 80 to 90%, of that which would cause precipitation of some polymer on standing. It is preferable to add the non-solvent diluted with at least 50% of the solvent, to avoid localized precipitation of polymer, and to provide efficient mixing during the addition.

(c) The ternary solution is rapidly heated to a temperature between the normal boiling point (i.e., at atmospheric pressure) of the solvent, T (°C)$_{B.P.}$, and 25° C. thereabove, thereby causing precipitation of small solid polymer particles. The pressure of the system at that temperature will be super-atmospheric and will be at least autogeneous pressure.

(d) The resultant mixture is then rapidly cooled to a temperature at least 10° C. below the normal boiling point of the solvent, preferably by flash evaporation. The flash evaporation is desirably carried out under shearing forces by rapidly discharging the heated mixture into a free confined space having a volume that is at least 1.5 times that of the mixture, a temperature maintained at least 10° C. below the solvent boiling point and a pressure below the vapor pressure of the heated mixture.

A notable advantage of the process of the invention is that it provides a means for making dispersions from polymers which have a negative coefficient of solubility, and which are not soluble in common low-boiling solvents. Another advantage is that it provides a means for making dispersions of these polymers wherein particle sizes are within the range of from about 1 to 30 microns. Of importance for ease of handling the resulting dispersions is the fact that the method provides such dispersions that are quite fluid at high solids levels.

The process of the invention is simple to carry out, requires relatively simple apparatus, and may be performed either as a batch process or continuously. In any case, the expensive and sometimes hazardous handling of large quantities of solvents is greatly minimized.

In the case where the aromatic polyamide to be dissolved in one of the above-mentioned solvents is crystalline, solution is desirably facilitated by the addition of a minor quantity of a halide salt selected from the group consisting of lithium chloride, lithium bromide, calcium bromide, calcium chloride, sodium bromide, ammonium bromide, magnesium chloride, and strontium chloride; again while maintaining a temperature within the range from 0 to 60° C. Preparation of solutions of the polymers in certain of the above-described solvents containing these salts is described in U.S. Patent No. 3,068,188.

The polyamides suitable for the process of the invention are those derived from substantially equimolar quantities of isophthalic acid or terephthalic acid and m-phenylene diamine or p-phenylenediamine. Polyamides made from derivatives of the above acids or diamines wherein the ring bears a methyl or ethyl group may also be utilized. Thus the polymers are fiber-forming linear polyamides consisting of recurring units of the formula

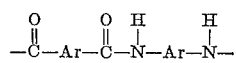

wherein each Ar radical is selected from the group consisting of

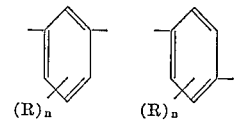

radicals, $n$ being an integer from 0 to 1 and R being a lower alkyl group of 1 to 2 carbon atoms, with the proviso that both Ar radicals are not p-phenylene. Poly(p-phenylenediamine terephthalamide) is unsuitable in the process of this invention owing to its highly insoluble character. Preparation of this class of polyamides is described in Canadian Patent No. 637,614. The preferred polyamide species is poly(m-phenylenediamine isophthalamide). The polymers are characterized by having their maximum solubility at a temperature within the range of from about 0° C. to about 60° C., the maximum depending upon the particular polymer/solvent combination utilized.

Polymer solutions containing 0.5 to 10% of the polymer, preferably 2–5%, are useful for preparing the dispersions. The resulting solution is diluted with water to a point short of, but close to, that at which the polymer would precipitate upon further addition of water. This solution is then heated, preferably in a closed vessel, to a temperature above the normal boiling point of the solvent and within the range of from 150 to 250° C.; a closed vessel is usually necessary to avoid loss of solvent by evaporation. The specific optimum temperature will depend upon the polymer/solvent/concentration conditions being used, but may be described as that point at which a major proportion of the polymer has precipitated out due to the decreased solubility at the elevated temperature. The resulting dispersion is stabilized by rapid cooling, this is preferably accomplished by flashing the mixture into a zone of lower temperature and pressure, whereby a portion of the solvent evaporates and thereby cools the condensed phase. The cooled dispersion may be stirred with additional water, if desired. It is believed that the quick cooling is necessary to prevent sticking of the insoluble polymer particles to each other and to prevent particle growth by "aging."

One suitable means for effecting the evaporative flash-cooling of the heated mixture is to utilize a pair of closed vessels of approximately equal internal capacity, the diluted solution being heated in the first and then discharged into the second vessel which is initially at about room temperature and atmospheric pressure or below so that a drop in temperature of at least 10° C. results from the flashing. This second vessel would suitably have a volume 1.5 to 20 times that of the liquid being flashed into it in batch operation. This second vessel may optionally be open to the atmosphere or provided with a source of vacuum to increase the extent of evaporation during the flashing. Alternatively, a single vessel will be used, the vessel being provided with an outlet that may be opened to the atmosphere or connected to a high capacity source of reduced pressure. It is desirable not to hold the liquid mixture at the elevated temperature for longer than is necessary, because of the chance for agglomeration and particle size growth. In order to promote formation of very small particles, it is preferable to heat the water-diluted solution as rapidly as possible, thereby initiating a large number of nucleation sites simultaneously.

The details of the mechanism by which the dispersions produced by this invention are made are not fully known. It is believed, however, that the rapid heating referred to above causes numerous crystallization or precipitation sites to form simultaneously, each site resulting in the formation of a particle of the polymer. By raising the temperature well beyond the precipitation point extremely rapidly the number of these sites is markedly increased. Cooling the dispersion rapidly then stabilizes the particles at the size of their initial formation, thereby greatly reducing the growth of the particles. Cooling by flash evaporation results in the quickest reduction of temperature, as compared, for example, to cooling by heat transfer.

The following examples illustrate this invention but are not intended to limit it in any respect. Unless otherwise stated, parts are by weight.

*Example I*

To a 5% by weight solution of poly(metaphenylenediamine isophthalamide), inherent viscosity 1.76, in dimethylacetamide, which solution also contains 1.5% calcium chloride, is added an equal volume of a 70/30 mixture of diamethylacetamide/water at about room temperature. A 125 milliliter (ml.) quantity of this solution is heated in a stainless steel pressure vessel having an internal capacity of 215 ml. up to a temperature of 170° C.; the vessel is tumbled end-over-end at about 1 revolution per second during the heating. As soon as this temperature is reached, the vessel is discharged into a second 215 ml. stainless steel vessel similar to the first, which is initially at room temperature and atmospheric pressure, the two vessels being connected through a Snap-Tite coupling. When the receiving vessel is cooled to approximately room temperature and opened, it is found to contain a stable dispersion containing fine particles of the initial polyamide.

When a few ml. of the diluted solution are heated in a sealed glass tube, it is found to become cloudy at about 170° C., and to form a copious white precipitate upon further heating to 200° C. Cooling of this suspension to room temperature gives very coarse particles, which settle rapidly.

*Example II*

The Example I procedure is used with 120 ml. of a solution that contains 4% by weight of the poly(metaphenylenediamine isophthalamide) used in Example I, 1.2% calcium chloride, and 15% water. Using the stainless vessels, the mixture is heated to 180° C. and then flashed into a receiving vessel. The resulting dispersion is stirred into 67 ml. of water to give a dispersion which partially separates on standing to give a concentrated dispersion containing about 5% solids. A small quantity of a moist cake left in the solution vessel is readily dispersed in water to give a fluid suspension containing 5% solids; this suspension partially separates on standing at least 1 day to give a stable fluid dispersion containing 6% solids. The particles in both the dispersions are found upon microscopic examination to comprise irregular feathery, spongy masses predominantly 2–8 microns across.

If the same 4% polymer solution (200 ml.) is simply heated to a cloud point (120° C.) in an open flask and then cooled, the resulting dispersion still contains appreciable dissolved polymer. The addition of 15 ml. of water produces a dispersion containing particles larger in size than those obtained in the preceding paragraph, many being up to 29 microns across. This dispersion may be concentrated on centrifugation to give a 6% solids dispersion that is readily poured. The formation of these coarser particles illustrates the advantage obtained in flash-cooling of the heated mixture.

*Example III*

The Example II procedure is followed in preparing a dispersion of poly(metaphenylenediamine isophthalamide) with a modified apparatus, in which cooling is provided by vaporization from the free space above the liquid mixture in the first vessel. The second vessel is placed beside the first bomb and the two are connected through their top openings by a U tube for the flash step. After cooling of the two vessels to room temperature, the first vessel is found to contain a dispersion similar to that obtained in Example II; most of the dispersion is in the solution vessel. Particle sizes are somewhat larger than those obtained by the Example II procedure.

*Example IV*

Poly(para-phenylenediamine isophthalamide) having an inherent viscosity of about 1.2 is dissolved in dimethylformamide by stirring the finely-divided polymer at room temperature, thereby giving an 8% solution. A 60/40 dimethylformamide/water mixture is added until incipient cloudiness is noted in the local area at the point of addition. A 100 ml. quantity of this solution is then heated in the vessel used for Example I to a temperature of 175° C., following which the mixture is flashed into the receiving vessel. Upon opening the receiving vessel, it is found to contain a dispersion of small particles of the initial polymer.

*Example V*

Samples of the 6% solids dispersion provided by Example II are coated on flat sheets of stainless steel or aluminum, and then dried in a circulating air oven held at 95° C. Upon drying, it is found that the dispersions have coalesced to form a transparent film that does not part from the metal strip upon folding 180°.

The solvents used to dissolve the polyamides for the process of this invention may be used alone or mixed with the earlier-mentioned salts dissolved therein. Water is the preferred non-solvent used to reduce the polymer solubility, although other non-solvents may be used. It is preferred that these non-solvents boil no higher than the solvent, in order to facilitate cooling by flash evaporation.

This process is applicable to the defined aromatic polyamides because their melting point is well in excess of 250° C., so that the polymer is precipitated in the solid state.

The term "dispersion" is used herein to mean a suspension of solid particles in a suspending liquid, which suspension does not sensibly settle on standing at room temperature for several hours. The dispersed particles may have a variety of shapes, which will be governed by the particular polymer, solvent, and the process conditions being used. In certain cases these particles may be roughly spherical with a rough or porous surface; in other cases they may be frazzled particles having a variety of dissimilar shapes. The dispersions produced in accordance with the preferred process of this invention will have an average particle size of less than about 10 microns.

Various modifying agents may be incorporated in the dispersions, or optionally into the polymer solutions before the flashing steps. Said additives may be dispersing agents to give long term storage stability, dyes, coloring agents, plasticizing agents, blowing agents, fillers, and the like.

The process of this invention may be carried out in a continuous operation on either a laboratory or commercial scale. Suitable means for operating in this fashion would be apparent to those skilled in the art. For example, a mixing chamber may be used to dissolve solid polymer in one of the previously mentioned solvents, solvent and polymer being added continuously at uniform rates, and the vessel being continuously discharged at a rate such as to maintain a constant volume of material within, the discharge being fed to one more additional hold chamber where solution is completed and non-solvent introduced, the solution from the hold chamber(s) being led through a heating coil to bring the temperature of the mixture up to the desired point within the range of 150–250° C., and then discharging the mixture from the heating coil into a flashing chamber maintained at a temperature of below about 100° C. and a reduced pressure, thereby producing a stable dispersion.

The dispersions prepared by the process of this invention are of value for metal, paper and textile coatings, as bonding agents, and in the preparation of dry powders. These dispersions are of particular value as coating materials because of their low flammability. High-solids dispersions may be made from the products of this invention by centrifugation, and the dispersing liquid may be replaced by another through a combined sequence of centrifugation and dilution with the new solvent. Other uses for these dispersions will be apparent to those skilled in the art.

What is claimed is:

1. Method for the production of polymeric dispersions which comprises the steps of:
   (a) providing a polymer solution formed of a solvent selected from the group consisting of dimethylformamide, dimethylacetamide, N-methyl-2-pyrrolidone, N-methylsuccinimide, N-methylglutarimide, and dimethylsulfoxide together with 0.5 to 10% by weight of a fiber-forming linear polyamide consisting of recurring units of the formula

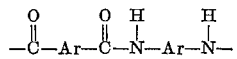

wherein each Ar radical is selected from the group consisting of

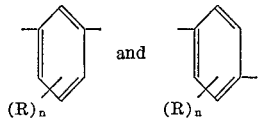

radicals, $n$ being an integer from 0 to 1 and R being a lower alkyl group of 1 to 2 carbon atoms, and with the proviso that both Ar radicals are not p-phenylene,
   (b) dissolving in said polymer solution a miscible non-solvent while maintaining a temperature for the resultant ternary solution within the range of 0 to 60° C., the proportion of said non-solvent in said solution being between about 50% and 95% by weight of that which would cause any polymer precipitation at the temperature thereof,
   (c) rapidly heating at a superatmospheric pressure the ternary solution without loss of solvent by evaporation to a temperature between the solvent normal boiling point, T (° C.)$_{B.P.}$, and T (° C.)$_{B.P.}$+25° C. to effect precipitation of polymer particles, and
   (d) rapidly cooling the resultant mixture to a temperature at least 10° C. below the solvent T (° C.)$_{B.P.}$.

2. The method of claim 1 wherein said polyamide is poly(m-phenylenediamine isophthalamide).

3. The method of claim 1 wherein said polymer solution additionally contains a minor quantity of a halide salt.

4. The method of claim 1 wherein said rapid cooling in step (d) is effected by flash evaporation.

References Cited by the Examiner

UNITED STATES PATENTS

| | | | |
|---|---|---|---|
| 2,342,387 | 2/1944 | Catlin | 260—78 |
| 2,420,455 | 5/1947 | Watkins | 260—29.2 |
| 2,742,440 | 4/1956 | Stott et al. | 260—78 |
| 2,989,495 | 6/1961 | Hare et al. | 260—29.2 |

MURRAY TILLMAN, *Primary Examiner.*